US005184488A

United States Patent [19]

Sandlin

[11] Patent Number: 5,184,488

[45] Date of Patent: Feb. 9, 1993

[54] MARINE OUTDRIVE LOCKING SYSTEM

[75] Inventor: William H. Sandlin, Gretna, La.

[73] Assignee: Anthony Cilbilich, Gretna, La. ; a part interest

[21] Appl. No.: 756,469

[22] Filed: Sep. 9, 1991

[51] Int. Cl.[5] ........................ B63H 23/34; F16B 41/00

[52] U.S. Cl. .......................................... 70/14; 70/232; 416/62

[58] Field of Search ........................ 70/232, 14, 57, 58, 70/158, 164, 178; 416/62

[56] References Cited

U.S. PATENT DOCUMENTS

| | | | |
|---|---|---|---|
| 3,732,033 | 5/1973 | Macchi | 403/317 X |
| 3,759,076 | 9/1973 | Reese | 70/178 X |
| 3,981,165 | 9/1976 | Wersinger | 416/146 B X |
| 4,097,191 | 6/1978 | Genuardi | 416/62 X |
| 4,257,247 | 3/1981 | Sims | 70/232 |
| 4,565,533 | 1/1986 | Springer | 416/247 A X |
| 4,715,783 | 12/1987 | Wade | 70/232 X |
| 4,760,719 | 8/1988 | Evans et al. | 70/18 |

FOREIGN PATENT DOCUMENTS

| | | | |
|---|---|---|---|
| 1028166 | 3/1978 | Canada | 416/146 B |
| 2705241 | 8/1978 | Fed. Rep. of Germany | 70/58 |

*Primary Examiner*—Lloyd A. Gall
*Attorney, Agent, or Firm*—Pravel, Gambrell, Hewitt, Kimball & Krieger

[57] ABSTRACT

An anti-theft locking system for marine outboard and out-drive units is provided. This system initially locks the motor propeller to the foot of the out-drive unit, and then allows a chain or cable to be used to lock the device, the boat, and the trailer to an immovable object. The locking system utilizes a locking member with a hook that engages the propeller, and wraps around the foot of the marine drive unit, providing a lockable portion to affix the device to the propeller and foot of the marine out-drive unit.

7 Claims, 4 Drawing Sheets

MARINE OUTDRIVE LOCKING SYSTEM

BACKGROUND OF THE INVENTION

1. Field Of The Invention

The present invention relates to locking devices for securing marine drive units with through propeller hub exhaust. The locking device locks the propeller to the foot/lower unit of the marine drive unit and provides a point where the user can secure the unit via chain or cable to a stationary object.

2. General Background

There are several locking devices on the market that lock different aspects of the trailable type power boat. There are locking devices for the trailer, locking devices for the outboard motor, locking devices for inboard/outboard drive units, and locking devices specifically for the propeller.

Currently there is not a locking device or locking system available that can lock all the major components. Using individual locking devices for each of the above listed components is expensive and time consuming. Trailer tongue type locks are available which lock the tongue of the trailer so that the trailer cannot be connected to a ball on an auto trailer hitch. These locks suffer in that they do not prevent a thief from simply tying the trailer tongue to a truck or auto bumper, using rope, and driving away. Several devices have been patented which relate generally to outboard motor lock systems. Some of these lock systems specifically address the boat propeller. Examples include U.S. Pat. No. 3,732,033 entitled "Boat Propeller Lock". The '033 patent provides an enclosure which can be locked in position to conceal a nut used to secure a boat propeller to a drive shaft. The enclosure includes a cover portion that can be locked into engagement with a base portion that is retained by and specifically the nut. Both the enclosure and the lock mechanism therefore are formed of an oxidation resistant material so as to prevent deterioration during use in the water environment.

U.S. Pat. No. 3,981,165 entitled "Outboard Motor Propeller Lock System" provides a device that is comprised of an inner thin lock and an outer thin lock, with the outer thin lock adapted to lock to the interior thin lock to prevent removal of its locking position on a propeller housing.

The Reese patent U.S. Pat. No. 3,759,076 entitled "Marine Propeller Lock" provides an elongated bar apparatus for lengthwise insertion longitudinally between the inner and outer sleeve portions of a marine propeller. The bar includes hook structure on the end to be inserted between the sleeve portions for hooked engagement with one of the generally radial lugs supporting the outer sleeve portion from the inner sleeve portion and a slide member is mounted on the other end portion of the rod and includes a laterally offset portion defining a recess opening toward the hooked end of the rod. The slide member is slidable along the rod into position to overlie and telescopingly receive an associated propeller retaining nut in the recess defined by the offset portion and a lock assembly is provided for releasably locking the slide member in position against movement away from the hooked end of the rod whereby access to the propeller retaining nut by a wrench or other nut removing tool is prevented and unauthorized removal of the propeller from the associated propeller shaft is prevented. As a safety measure, the propeller lock is free of portions which would interfere with normal turning of the associated propeller and thus inadvertent operation of the associated motor without first removing the propeller lock will not cause damage to the propeller or other associated running gear even though a turning propeller having the propeller lock mounted thereon will cause an apparent vibration so as to immediately remind a person who has inadvertently started the associated motor that the propeller lock has not been removed.

Another hub lock for marine propellers is seen in the Milewicz U.S. Pat. No. 3,981,617 entitled "Marine Propeller Lock".

An enclosure for locking a boat propeller is seen in the Sims patent U.S. Pat. No. 4,257,247 entitled "Boat Propeller Security Device". The apparatus includes a cover having legs which extend from the rear of the propeller and in between each of the propeller blades. The legs provide openings at their end portions making it possible for attaching a chain through the feet and securing opposite ends of the chain with a lock.

An enclosure device for use with a marine inboard/-outboard type outdrive unit is seen in the Peters U.S. Pat. No. 4,325,701 entitled "Protective Device". The device of the '701 patent provides a housing having a top wall, a back wall, and opposing side walls which extend downwardly from the top wall and on opposite sides thereof. The top wall of the housing includes a slot through the mooring eye on the outdrive is positioned and in so doing the threaded fasteners which connect the outdrive to the transmission are inaccessibly positioned between the housing side walls. The housing itself is removably secured to the outdrive by a padlock having its bolt extending through the mooring eye in order to permit removal of the outdrive only by authorized personnel.

The Brushaber U.S. Pat. No. 4,736,603 entitled "Marine Drive Unit Anti-Theft Device" provides an anti-theft device for a marine drive unit which includes a cupped member for location around a threaded fastener which secures the drive unit in place so as to enable a blocking device to be secured in position to block access to the threaded fastener and thereby preclude unauthorized removal of the threaded fastener and the drive unit, the cupped member having outer surfaces lying in mutually perpendicular planes forming a corner complementary to a corner of the drive unit to preclude rotation of the cupped member when seated in the corner of the drive unit in order to further prevent unauthorized rotation of the threaded fastener.

The Evans U.S. Pat. No. 4,760,719 entitled "Non-Key Locking Cable Lock For Marine Vessel" provides a cable-like device for securing an outboard motor to a marine vessel. A portion of the steel cable extends into the transom of the boat.

All of the current patents and devices on the market that are propeller locking systems prevent access in one form or another to the propeller attachment nut. This device differs in that the propeller attachment nut is accessible but the propeller itself is constrained where that it cannot be slid off the propeller shaft.

SUMMARY OF THE PRESENT INVENTION

The present invention provides an improved locking system that can be used to lock an outboard motor or sterndrive to the propeller, the boat and trailer to a fixed object when the boat is being unattended. This design feature allows the unit to be used on land or in the water. The apparatus features a pair of flexible side straps and an end hook plate that "hooks" the boat outdrive propeller. The side straps extend in front of the foot of the marine drive unit and can be padlocked at that location. The padlock can then secure a chain or cable to boat trailer, hull, transom, and/or a fixed object such as a telephone pole, utility pole, or like anchor device.

BRIEF DESCRIPTION OF THE DRAWINGS

For a further understanding of the nature and objects of the present invention, reference should be made to the following detailed description taken in conjunction with the accompanying drawings, in which like parts are given like reference numerals, and wherein.

DETAILED DESCRIPTION OF THE PREFERRED EMBODIMENT

Figure 1:
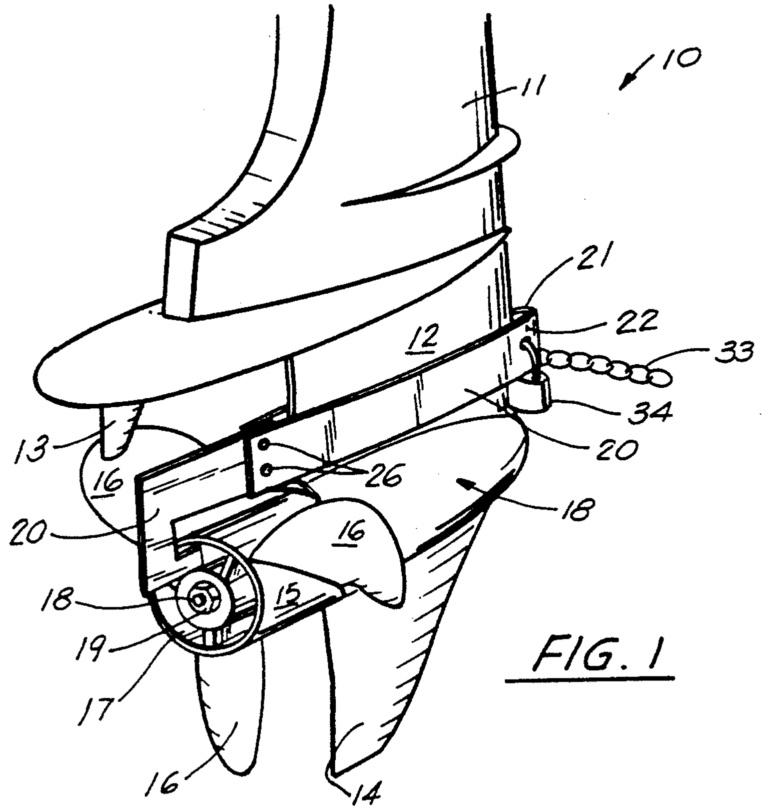
FIG. 1 is a fragmentary perspective view of the preferred embodiment of the apparatus of the present invention in operative position on a marine drive unit.

FIGS. 1–4 illustrate the preferred embodiment of the apparatus of the present invention designated generally by the numeral 10.

In FIGS. 1–4, an outdrive 11 is illustrated. It should be understood that outdrive could be for example, the bottom portion of a outboard motor, or the outdrive of a inboard/outboard type outdrive unit.

Outdrive 11 includes a lowermost or foot 12 portion having trim tab 13, skeg 14, and attached propeller 15. The propeller 15 has a plurality of blades 16 (usually 3) connected to a central cylindrically shaped hub 17. The hub 17 is mounted to a horizontally extending propeller drive shaft 18 that extends rearwardly from the foot 12. A locking nut 19 usually attaches by means of a threaded connection to the drive shaft 18 for securing the propeller 15 in its operating position.

Locking apparatus 10 includes a frame 20 having a first port side horizontal strap 21 and a second starboard side horizontal strap 22. Each of the straps 21, 22 has an opening therein for purposes of accommodating a common padlock. This padlock also allows the frame 20 to be attached by means of a chain, cable or the like to the boat trailer, its transom, or to a fixed object such as a utility pole, fence pole, or the like.

The side horizontal straps 21, 22 are attached at point 25 using rivets 26 for example to rear portion 27 of frame 20. The connected straps 21, 22 form a yoke with an opening 32 therebetween (see FIG. 3). The side portions 21, 22 are preferably bendable. The propeller locking arm 27 includes a center horizontal limb 28 and vertical limb 29 for engaging a rear annular surface of the propeller to which hook portion 30 is attached. In the preferred embodiment, the center horizontal limb 28, the vertical limb 29, and the hook 30 are an integrally formed piece manufactured for example of plate metal such as steel, stainless steel, aluminum or the like.

Figure 2:
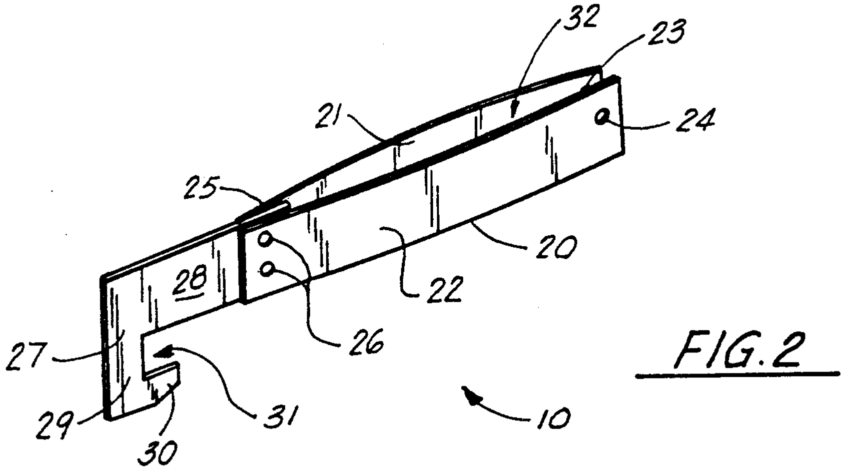
FIG. 2 is a perspective view of the preferred embodiment of the apparatus of the present invention.
Figure 3:
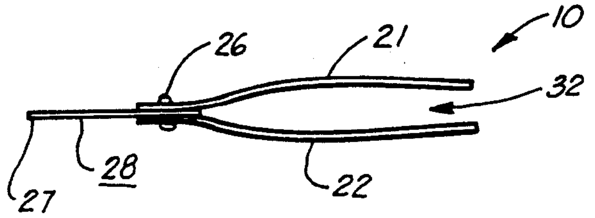
FIG. 3 is a plan view of the preferred embodiment of the apparatus of the present invention.

Hook 30 is spaced vertically below the center horizontal limb 28, defining a space or recess 31 (see FIG. 2). There is a space 32 between the horizontally extending straps 21, 22, between which is occupied by the foot 12 of the outdrive 11 during operation as shown in FIGS. 1 and 3.

Figure 4:
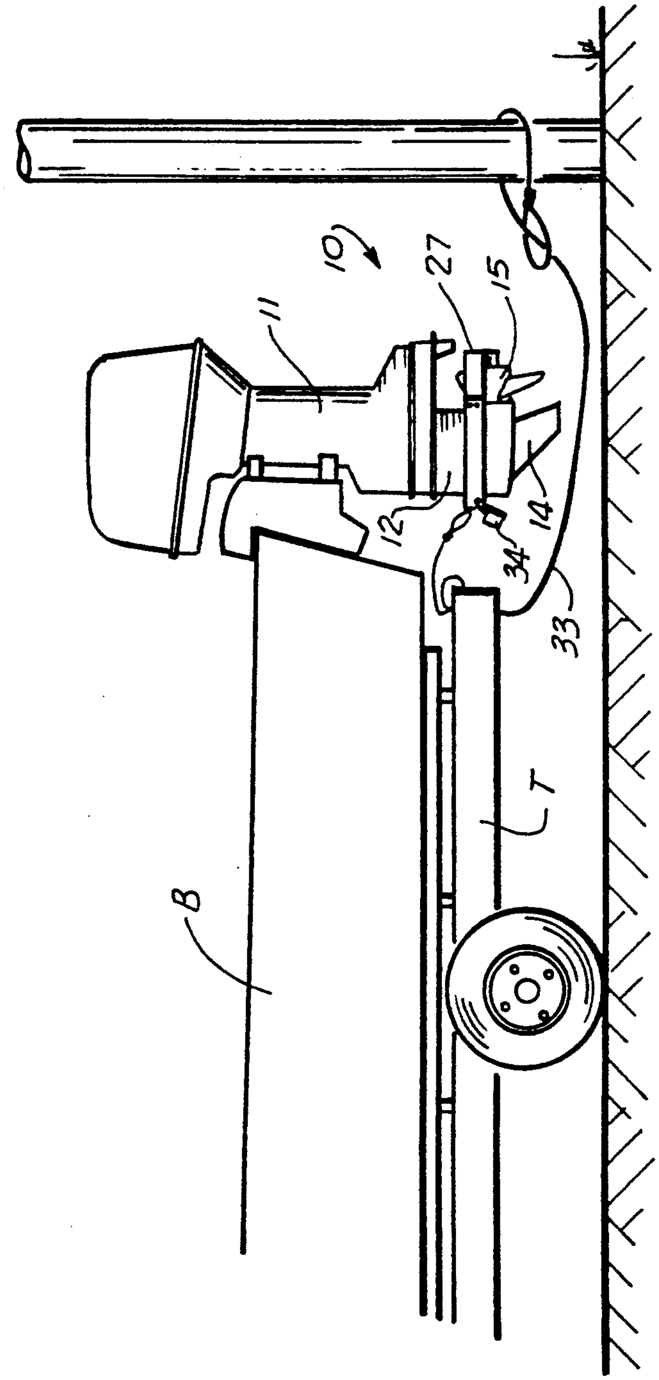
FIG. 4 is an elevational view of the preferred embodiment of the apparatus of the present invention illustrating the apparatus as installed on an outboard motor, boat and trailer.

Padlock 34 attaches through openings 23, 24. Further, a cable/chain 33 is attached at padlock 34 as shown in FIGS. 1 and 4. This allows the entire locking apparatus 10 to be affixed to a telephone pole, light pole, pier or the like by using an elongated cable/chain 33. The user simply passes the elongated cable/chain 33 through the frame of the boat trailer, through a pad eye or lift eye or ski eye on the boat or its transom, and then around a fixed object such as a utility pole, or the like.

Figure 5:
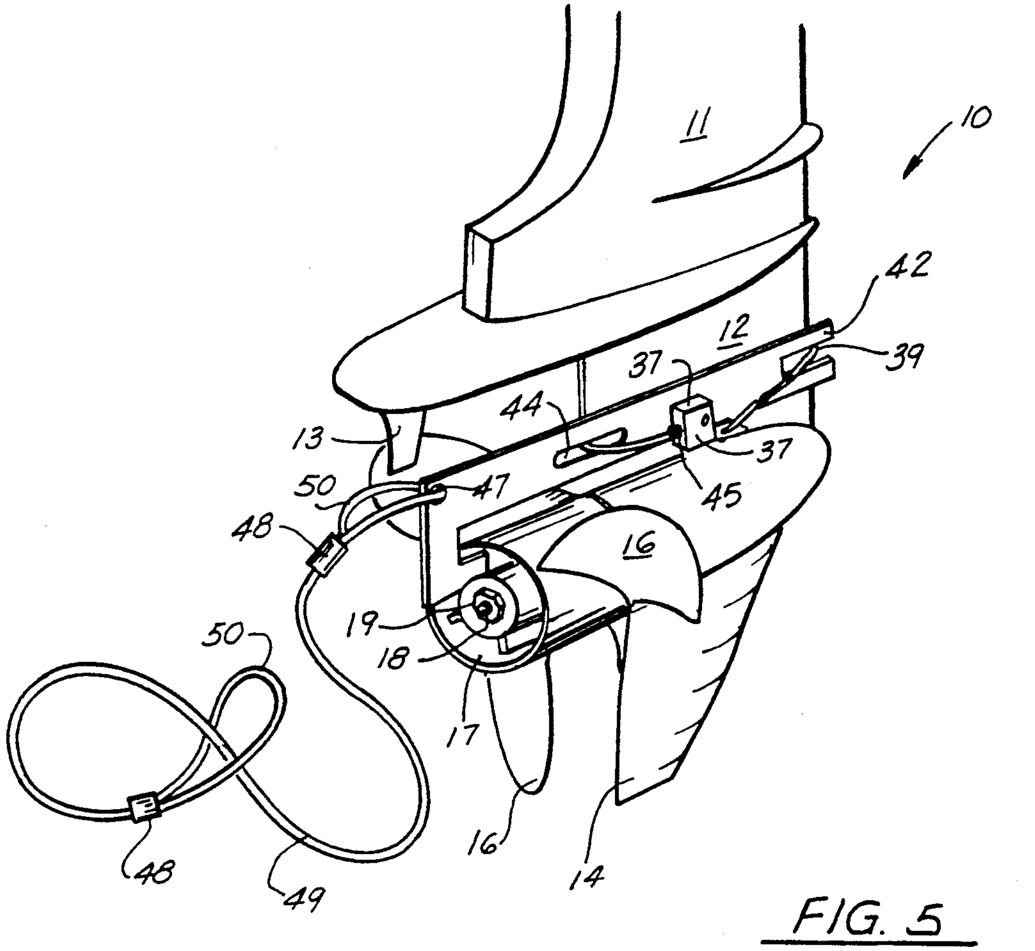
FIG. 5 is a fragmentary perspective view of an alternate embodiment of the apparatus of the present invention.
Figure 6:
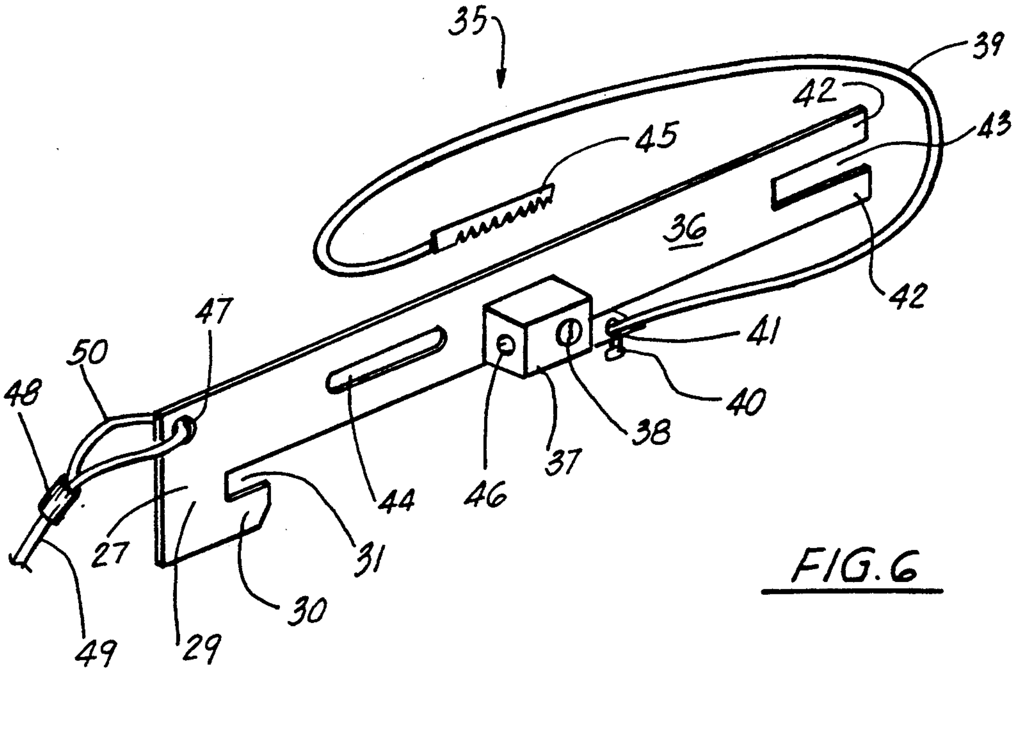
FIG. 6 is an enlarged perspective view of the embodiment of FIG. 5.

FIGS. 5 and 6 illustrate a second embodiment of the apparatus of the present invention designated generally by the numeral 35. Locking apparatus 35 includes a horizontally extending limb member 36 with a lock 37 attached thereto. The lock 37 has a key slot 38 and cable 39 attaches to lock 37 at opening 41. The cable 39 has a crimped stop end 40 adapted to register with and anchor in opening hole 41. The crimped stop end is sized to anchor at the opening. Strap 36 includes two spaced apart bar members 42 with a space 43 therebetween that accommodates the cable 39 during use as shown in FIG. 5. The cable 39 includes a toothed locking tab member 45 that extends through a horizontal opening 44 in the strap 36 and on into the opening 46 formed in lock 37. The toothed locking tab 45 registers with the opening 46 of lock 37 and is secured in opening 46 until a key placed in the opening 38 unlocks the tab 45. It should be understood that the lock 37 and toothed locking tab 45 as well as the cable 39 are commercially available members used for example in bicycle locks.

The rear portion 27 of strap 36 includes an opening 47 to which a second cable 49 can be attached at loop 50. The cable loop 50 is formed using a common crimped fitting 48 for example. As with FIG. 1, the hook 30 and slot 31 engage propeller 15.

Figure 7:
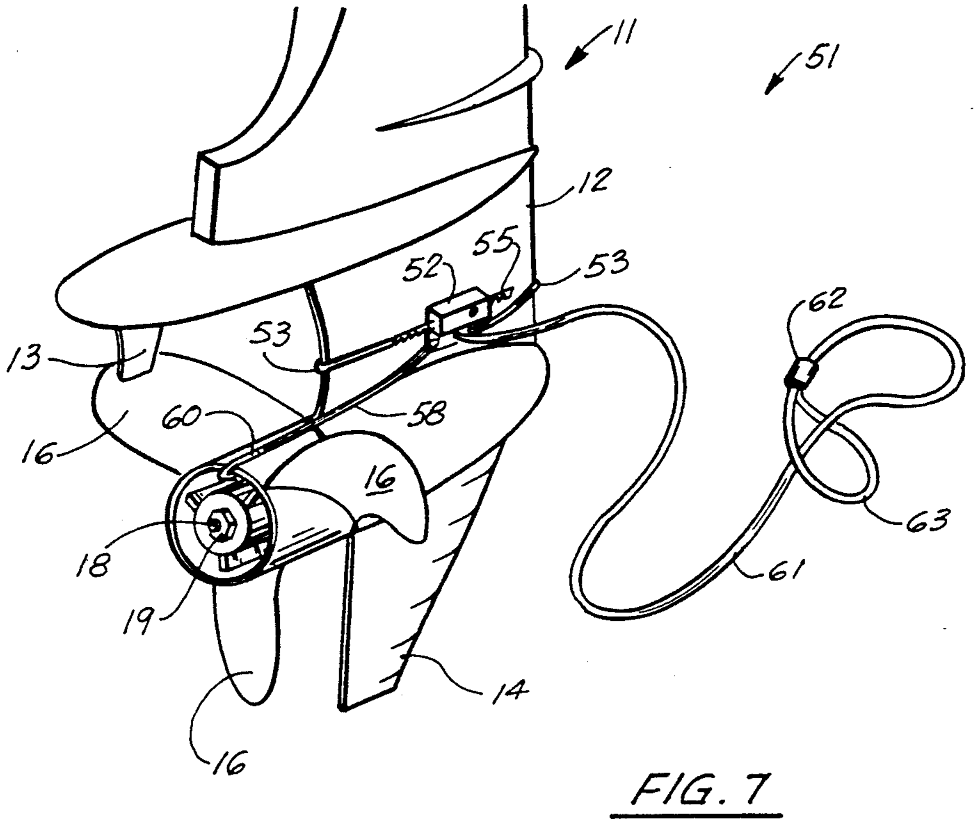
FIG. 7 is a fragmentary perspective view of a second alternate embodiment of the apparatus of the present invention.
Figure 8:
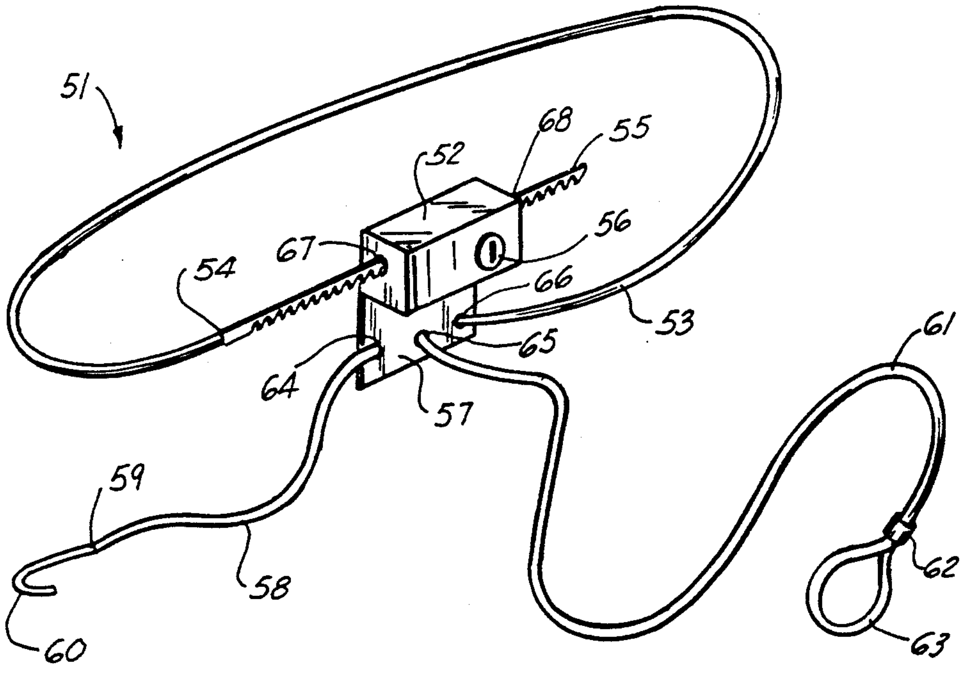
FIG. 8 is an enlarged perspective view of the embodiment of FIG. 7.

In FIGS. 7 and 8, a third embodiment of the apparatus of the present invention is illustrated, designated generally by the numeral 51. Locking apparatus 51 includes a lock housing 52 having a cable 53 extending therefrom. A toothed locking pad 55 attaches to the cable 53 at joint 54. The lock housing 52 provides a key slot 56 which can release the locking tab 55 from its position within the lock housing 52. The lock housing 52 is a commercially available locking device operable with a key at the key slot 56. The toothed locking member 55 can be released by turning the key 56. Key housing 52 is attached to vertical flange 57.

A plurality of openings 64–66 are formed in the flange 57. Cable 58 extends from opening 64. Cable 61 extends from opening 65, and the cable 53 extends from opening 66 (see FIG. 8). The cable 61 provides a loop 63 end portion formed by using crimped fitting 62. The looped end 63 is designed to be secured to the boat trailer or boat transom by passing the cable 61 through a pad eye or ski eye on the boat transom and then around the trailer and then passing the locking device 51 through the loop 63 before locking the device 51.

The hook 60 engages the propeller hub as shown in FIG. 7.

During use, the lock housing 52 and the vertical flange 57 are placed against the foot as shown in FIG. 7. The cable 53 is then wrapped around the foot and the locking tab 55 inserted through the lock housing 52, beginning at opening 67 and exiting at opening 68. The hook 60 is secured to the propeller hub so that when the locking tab 55 extends into the lock housing 52, it extends as far as possible until tension in the cable 58 is maximized. In this position, removal of the hook 60 is disallowed because the lock housing is tightly secured against the foot in the position shown in FIG. 7. The user simply continues to adjust the position of the lock housing 52, the position of the cable 53, and the locking tab 55 until all possible slack has been removed from the cable 53 and with the cable 58 being stretched to a straight line, removing any possible slackness in the cable 58. Once cables are crimped by the owner to conform to the shape/sharp bend on the foot 12, flange 57 cannot be easily moved.

The following table lists the part numbers and part descriptions as used in this written specification and in the attached drawings FIGS. 1-8.

PARTS LIST

| Part Number | Description |
|---|---|
| 10 | locking apparatus |
| 11 | outdrive |
| 12 | foot |
| 13 | trim tab |
| 14 | skag |
| 15 | propeller |
| 16 | blade |
| 17 | hub |
| 18 | drive shaft |
| 19 | locking nut |
| 20 | frame |
| 21 | side horizontal strap |
| 22 | side horizontal strap |
| 23 | opening |
| 24 | opening |
| 25 | joint |
| 26 | rivet |
| 27 | propeller locking arm |
| 28 | end hook plate |
| 29 | vertical limb |
| 30 | vertical limb |
| 31 | recess |
| 32 | space |
| 33 | cable/chain |
| 34 | padlock |
| 35 | locking apparatus |
| 36 | horizontal limb |
| 37 | lock |
| 38 | key slot |
| 39 | cable |
| 40 | stop |
| 41 | opening |
| 42 | vertically spaced bars |
| 43 | space |
| 44 | slot |
| 45 | toothed locking tab |
| 46 | opening |
| 47 | opening |
| 48 | crimped fitting |
| 49 | cable |
| 50 | cable loop |
| 51 | locking apparatus |
| 52 | lock housing |
| 53 | cable |
| 54 | joint |
| 55 | toothed locking tab |
| 56 | key slot |

-continued

PARTS LIST

| Part Number | Description |
|---|---|
| 57 | vertical flange |
| 58 | cable |
| 59 | joint |
| 60 | hook |
| 61 | cable |
| 62 | crimped fitting |
| 63 | loop |
| 64 | opening |
| 65 | opening |
| 66 | opening |
| 67 | opening |
| 68 | opening |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An anti-theft device for deterring unauthorized removal of a trailer and boat having an outboard motor with a propeller having a plurality of blades, a cylindrical hub with a cylindrical outside surface, the hub terminating at a rear annular surface, and the hub having a hollowed interior area communicating with the hub annular surface, the motor having port and starboard sides, comprising:

a) a yoke that has port and starboard side portions extendable respectively around the port and starboard sides of the outboard motor and including a portion that extends to a position adjacent the propeller hub;

b) lock means for forming a removable connection between the yoke and the outboard motor so that the yoke can be attached to the outboard motor in a locked operative position, and removed therefrom in an unlocked position; and c) a propeller locking arm extending rearwardly from and attached between the side portions along the entire length of the cylindrical hub and on the outside surface thereof, engaging the rear annular surface of the propeller and extending into the hollowed area of the hub in the locked operative position, so that removal of the propeller is disabled by preventing the propeller from being separated from the outboard motor when the yoke is in a locked operative position.

2. The device of claim 1 wherein the pair of side portions are each bendable.

3. The device of claim 1 wherein the locking arm includes a hook portion that extends around the rear of the propeller preventing the propeller from being separated from a propeller shaft.

4. The device of claim 1 wherein the locking arm includes a portion that passes between two of the propeller blades in the locking operative position.

5. The device of claim 1 wherein the yoke extends to positions in front and behind the outboard motor.

6. The device of claim 1 wherein the yoke includes interlocking portions that can be disassembled when in the unlocked position.

7. An anti-theft device for deterring unauthorized removal of an outboard motor with a propeller having a plurality of blades, a cylindrical hub with a cylindrical outside surface, the hub terminating at a rear annular surface, and the hub having a hollowed terminating area, the motor having port and starboard sides, comprising:

a) a yoke that has port and starboard side portions extendable respectively around the port and starboard sides of the outboard motor and including a portion that extends to a position adjacent the propeller hub;

b) lock means for forming a removable connection between the yoke and the outboard motor so that the yoke can be attached to the outboard motor in a locked operative position, and removed therefrom in an unlocked position; and c) a propeller locking arm extending rearwardly from and attached between the side portions along the entire length of the cylindrical hub and on the outside surface thereof, engaging the rear annular surface of the propeller and extending into the hollowed area of the hub when in the locked operative position, so that removal of the propeller is disabled by preventing the propeller from being separated from the outboard motor when the yoke is in the locked operative position.

* * * * *